United States Patent [19]
Rutten

[11] Patent Number: 5,403,531
[45] Date of Patent: Apr. 4, 1995

[54] ELONGATED OBJECT MADE OF A COPOLYMER OF CARBON MONOXIDE AND AN OLEFINICALLY UNSATURATED MONOMER, AND METHOD FOR THE PRODUCTION THEREOF

[75] Inventor: Hendrikus J. J. Rutten, Maastricht, Netherlands

[73] Assignee: DSM N.V., Heerlen, Netherlands

[21] Appl. No.: 150,242

[22] Filed: Nov. 9, 1993

Related U.S. Application Data

[62] Division of Ser. No. 775,978, Oct. 31, 1991, Pat. No. 5,281,692.

[30] Foreign Application Priority Data

May 19, 1989 [NL] Netherlands ............ 8901253

[51] Int. Cl.[6] .................... B29C 41/24; B29C 55/12
[52] U.S. Cl. .................... 264/204; 264/290.2; 264/331.17
[58] Field of Search ........... 264/204, 205, 203, 211.15, 264/211.16, 344, 331.17, 290.2

[56] References Cited

U.S. PATENT DOCUMENTS

| | | |
|---|---|---|
| 4,076,911 | 2/1978 | Fenton . |
| 4,787,194 | 11/1988 | Lancaster et al. ............ 156/274.4 |
| 4,788,279 | 11/1988 | Drent ............ 528/392 |
| 4,895,689 | 1/9990 | Gerlowski ............ 264/204 |
| 5,045,258 | 9/1991 | van Breen et al. ............ 264/205 |
| 5,175,245 | 12/1992 | Klingensmith . |

FOREIGN PATENT DOCUMENTS

| | | |
|---|---|---|
| 0213671 | 3/1987 | European Pat. Off. . |
| 0310171 | 4/1989 | European Pat. Off. . |
| 0360358 | 3/1990 | European Pat. Off. . |

*Primary Examiner*—Jeffery R. Thurlow
*Attorney, Agent, or Firm*—Cushman, Darby & Cushman

[57] ABSTRACT

A process for producing an elongated object of an alternating copolymer of carbon monoxide and an olefinically unsaturated monomer wherein the copolymer has an intrinsic viscosity measured in m-cresol at 100° C. of at least 1 dl/g, involve converting a solution of the copolymer into a solvent-containing object, removing between 90 and 99.9% of the solvent from the solvent-containing object, and stretching the thus obtained object at a temperature below the melting point of the copolymer.

11 Claims, No Drawings

ELONGATED OBJECT MADE OF A COPOLYMER OF CARBON MONOXIDE AND AN OLEFINICALLY UNSATURATED MONOMER, AND METHOD FOR THE PRODUCTION THEREOF

This is a division of U.S. application Ser. No. 07/775,978, filed Oct. 31, 1991, now U.S. Pat. No. 5,281,692.

The invention relates to an elongated object made of an orientated alternating copolymer of carbon monoxide and an olefinically unsaturated monomer.

EP-A-310,171 discloses an object of this type in which fibres of an alternating copolymer of carbon monoxide, CO, and one or more olefinically unsaturated components are spun from the molten copolymer and orientated by stretching.

Although the tensile strength of these fibres is adequate for a number of applications, the modulus of elasticity remains below the values which with many other polymer fibres are associated with such a tensile strength. It should be noted that EP-A-310,171 only mentions values for the flex modulus of the fibres. This modulus is usually determined on rectangular bars according to methods which are not applicable to fibres, such as ASTM standard D790-86. Although EP-A-310,171 does not specify this, it is most likely that the term 'flex modulus' is used for fibres here to indicate that not the initial modulus is stated, but the tangent modulus in the straight part of the curve, as is the case in determination of the flex modulus by said methods, such as ASTM standard D790-86. Their relatively low flex modulus makes the known fibres unsuitable for applications for which the tensile strength would be adequate but for which a high modulus is necessary. Examples of such applications are the reinforcing component of composite materials and improvement of the impact strength of objects.

The invention now provides an elongated object made of a copolymer of carbon monoxide and an olefinically unsaturated component, the modulus of elasticity of which is at least 16 GPa and preferably at least 22 GPa. More preferably, the tensile strength of the object is at least 1.2 GPa and the modulus of elasticity at least 30 GPa and particularly preferentially these parameters are at least 1.5 GPa and 40 GPa respectively.

For a specific value of the tensile strength, the modulus of the object according to the invention is appreciably higher than in the case of the known orientated objects made from the copolymer.

The invention also provides an elongated object made of a copolymer of carbon monoxide and an olefinically unsaturated component with a high tensile strength, and preferably this tensile strength is at least 2 GPa.

Elongated objects are understood to be objects for which the dimension in at least one direction is appreciably larger than in at least one of the other directions. Examples of such objects are fibres, threads, tapes and films. The objects according to the invention are orientated, for example by stretching, in at least one direction.

An alternating copolymer of carbon monoxide with an olefinically unsaturated component, designated CO copolymer below, is essentially a copolymer which is built up from one unit which is derived from an olefinically unsaturated monomer unit alternating with a carbon monoxide unit. The proportion of each of the components is thus 50 mol %. This is also the maximum possible proportion of the CO units in a copolymer of this type. Within the framework of the invention, if the copolymer consists to the extent of at least 48 mol % of CO units said copolymer is also referred to as an alternating copolymer. As disclosed in EP-A-310,171, the olefinically unsaturated component used can be, for example, ethene, propene and higher alkenes or mixtures thereof. The characteristics of the CO copolymer depend on the olefinically unsaturated monomers used. CO copolymers in which the proportion of ethene in the olefinic part is at least 95 mol % are particularly suitable. Copolymerization of even minor amounts of other olefinically unsaturated monomers, such as, for example, propene, give rise to an appreciable fall in the melting point of the copolymer relative to a copolymer which has the same CO content and in which otherwise only ethene is copolymerized. Preferably, the object therefore consists of a CO-ethene copolymer, which is understood to be a CO copolymer in which only ethene is present as olefinically unsaturated component.

Surprisingly, it appears that an object made of orientated CO-ethene copolymer has an appreciably higher melting point than the CO-ethene starting material, which as a rule lies between 250° and 257° C., while by preference the CO-ethene polymer is orientated to the extent that the melting point is at least 265° C.

The intrinsic viscosity, IV, of the CO copolymer, determined at 100° C. in m-cresol, is preferably at least 1 dl/g. Methods for producing CO copolymers of this type are known per se from, for example, EP-A-121,965 and EP-A-239,145.

The invention also relates to a method for the production of an elongated object from an alternating copolymer of carbon monoxide and an olefinically unsaturated monomer, which copolymer has been orientated by stretching.

EP-A-310,171 also discloses a method of this type, in which a copolymer of carbon monoxide, ethene and 8 mol % propene-ethene with a melting point of 220° C. is spun at a temperature of 287° C., thus above its melting point, to give a fibre, and stretched at a temperature of 207° C. to give a fibre with a modulus of 15.1 GPa and a tensile strength of 1.4 GPa.

A disadvantage of this method is that, despite the relatively high tensile strength which can be achieved, the associated modulus has only a low value, while in many cases it is the modulus which determines whether the object produced can be used in a specific case. It may also be anticipated, as disclosed, inter alia, in U.S. Pat. No. 4,798,884, column 2, lines 24–41, that degradation and discolouration of the CO copolymer occurs at the temperatures used, which are above the melting point.

It is most likely for this reason that in all examples of EP-A-310,171 one or more olefinically unsaturated monomers, in particular an ethene-propene copolymer, are incorporated in the CO copolymer. This incorporation does enhance the thermal stability, but at the same time it causes the melting point of the CO copolymer to decrease considerably. Thus one of the main advantages of objects made from a CO-ethene copolymer, viz. resistance to high temperatures, is lost.

A further aim of the invention is to provide a method for the production of orientated objects from a copolymer of carbon monoxide with an olefinically unsaturated component, which have a modulus which is appreciably higher than can be obtained by the known method.

This aim is achieved according to the invention in that the copolymer is dissolved in a suitable solvent,
the solution obtained is converted, at a temperature above the dissolving point of the solution, into an object consisting of the solution,
the object consisting of the solution is converted to a solvent-containing object consisting of the copolymer,
all or some of the solvent is removed from the solvent-containing object consisting of the copolymer, and
at least the object thus obtained or the solvent-containing object consisting of the polymer is stretched at elevated temperature.

Surprisingly, if they have acquired a specific strength by stretching, objects obtained using the method according to the invention are found to possess an appreciably higher modulus than the known objects. In particular, this is also surprising because it is found that an advantageous result of this type is not achieved if this method is applied to other polymers with a high melting point, such as nylon, polyvinylidene fluoride and polyesters. Thus, for example, it is known from an article by F. Gogolewski and A. J. Pennings in Polymer, 1985, Vol. 26, pages 1394-1400, that spinning nylon from a solution and stretching the spun fibres does not lead to a high value of the modulus of elasticity.

A further advantage of the method according to the invention is that in case of application a CO-ethene copolymer, no degradation phenomena occur, in contrast to the melt processing according to the known method. In the method according to the invention the copolymer used is preferably a CO-ethene copolymer, on account of the appreciably higher temperature resistance of objects made thereof.

In order to obtain objects made of CO copolymer which have a good stretchability below the melting point, the intrinsic viscosity, IV, of the copolymer, measured at 100° C. in m-cresol, is at least 1 dl/g.

In the case of the method according to the invention, the CO copolymer is dissolved in a suitable solvent. Suitable solvents are those in which the CO copolymer forms a homogeneous solution at a temperature below the melting point of the CO copolymer. It has been found that, in general, suitable solvents satisfy the condition that their dipole moment is between $3 \times 10^{-30}$ and $9 \times 10^{-30}$ Coulomb-meter and that their Hildebrand solubility parameter is between 16 and 27 MPa$^{-\frac{1}{2}}$ and preferably solvents which meet these conditions are used. The definition of the Hildebrand parameter is to be found in the "CRC Handbook of solubility parameters and other cohesion parameters" by Allan F. M. Barton, 1983, CRC Press, Inc., page 8. The values of the said parameters for the solvents mentioned in this application and for many other solvents are to be found in the same reference, page 186 et seq. and in generally used specialist literature, such as the "CRC Handbook of Chemistry and Physics" and the "Polymer Handbook". Very preferentially, a solvent is used which is chosen from the group consisting of hexafluoro-isopropanol, m-cresol, phenol, pyrrole, 2-chlorophenol and 3-chlorophenol.

The method according to the invention imposes no principal limitations on the concentration of the CO copolymer in the solution. Solutions which have a concentration of more than 50% by weight are more difficult to handle because of the high viscosity which arises, in particular in the case of higher molecular weights, while at very low concentrations, for instance lower than 0.5% the process becomes economically highly unadvantageous because of the relatively large amount of solvent, which has to be processed. In connection with these boundary conditions, the concentration of the CO copolymer in the solution is preferably between 0.5 and 50 wt. %, more preferably between 2 and 35% by weight.

The solution obtained is converted, at a temperature above the dissolving point, into an object, consisting of the solution, which is then converted to a solvent-containing object consisting of the CO copolymer. This can take place in various ways known per se, such as dry spinning or dry extrusion, in which case an object consisting of the solution is formed and, for example, fed into an air duct, into which, if desired, air or an inert gas is blown and in which cooling of the object, evaporation of the solvent, or both, take(s) place. Use can also be made of wet spinning or wet extrusion, in which case an object consisting of the solution is formed which, after passing through a small air gap if appropriate, is fed into a liquid bath or successively in several liquid baths in a row in which cooling of the object, partial or complete extraction of the solvent from the object, or both, take(s) place simultaneously or successively. Another way of forming the object consisting of the solution is casting of the solution on a plate, strip or roll, in which case the conversion of the object consisting of the solution to a solvent-containing object consisting of the copolymer can take place in one of the ways described above.

In addition to the said known ways of converting the object consisting of the solution to a solvent-containing object consisting of the CO copolymer, that is to say cooling, evaporation or extraction, it has proved possible to effect this conversion by bringing the object consisting of the solution into intimate contact with specific non-solvents for the CO copolymer, in which case the conversion appears to be effected by the penetration of the non-solvent into the object, apart from the removal of the solvent from the object by the non-solvent, which plays the major role in the case of extraction and also when the non-solvent has a temperature which is not or hardly lower than that of the object, so that cooling cannot play a role suitable non-solvents for this form of conversion are ketones such as acetone and methyl ethyl ketone and toluene. In the case of dry spinning and dry extrusion and in the case of casting of the solution on a strip or roll, the requisite intimate contact between the object, consisting of the solution, and the non-solvent can be effected by passing the non-solvent in vapour or atomized form into the air duct or over the object consisting of the solution. In the case of wet spinning and wet extrusion, the non-solvent may be present in the liquid bath into which the object is passed. Besides the non-solvent, an extractant may already be present in this liquid bath. The intimate contact with the non-solvent can also be produced by mixing the non-solvent with the solution shortly before the latter leaves the spinning or extrusion opening.

In the said processes, the solubility of the CO copolymer in the object consisting of the solution decreases, either as a result of the cooling, or as a result of the removal of at least part of the solvent, or as a result of coming into contact with a suitable non-solvent, or as a result of a combination of these three, such that a separation takes place in the object consisting of the solution into a phase which essentially consists of the CO copolymer and a phase, incorporated therein, which consists entirely or partially of the solvent. The object consisting of the solution is thus converted to a solvent-containing object consisting of the CO copolymer, which object has sufficient rigidity to enable it to be handled in the requisite subsequent processing operations.

The liquids used as cooling liquid and/or extraction liquid are those in which the CO copolymer does not dissolve or barely dissolves at the temperature used. Examples of such liquids are alkanols, such as methanol, ethanol and butanol, and liquids for which the dipole moment or the Hildebrand solubility parameter are outside the range indicated in the above for the solvents. If the phase separation, described above, in the object consisting of the solution essentially takes place as a consequence of extraction, the liquid used must be miscible with the solvent.

Preferably, a gelling solvent is used and the object consisting of the solution is cooled to below the gel point of the solution, a gel object being formed which is characterized by a high degree of stretchability and the stretching, if appropriate after complete or partial removal of the solvent, is accompanied by a substantial increase in the tensile strength and the modulus. In particular, pyrrole is found to be very suitable as a gelling solvent.

The shape of the object formed using the known techniques described above depends on the technique used and therefore, for example, on the surface onto which the solution is cast or on the opening through which the solution is spun or extruded, a broad slit of small height being, for example, very suitable for obtaining an object in film form, while fibres can be produced by using circular openings of small diameter.

In order to obtain an object consisting of CO copolymer and having the desired high tensile strength and modulus of elasticity, the object obtained in one of the preceding process steps must be stretched. A partial pre-stretching can already take place by applying a stretch tension to the object, consisting of the solution, leaving the spinning or extrusion opening. However, irrespective of any pre-stretching, the object must be stretched at elevated temperature, and after complete or partial removal of the solvent, after the phase separation described above has taken place. Preferably, the object, consisting of the CO copolymer, still contains 0.1–10% by weight of solvent at the start of stretching because it has been found that this promotes the stretchability. The removal of the solvent can take place in ways known per se, such as evaporation or extraction with a liquid which at the temperature used is not a solvent for the CO copolymer but is miscible with the solvent.

The object from which all or some of the solvent has been removed is preferably stretched to a degree of stretching which is sufficient to obtain an object which has a modulus of at least 16 GPa. This stretching takes place at elevated temperature, in particular above 125° C., but below the temperature at which thermal degradation of the CO copolymer takes place to a significant degree and at all events below the melting point of the CO copolymer. In order to prevent degradation of the CO copolymer it is advantageous to allow the stretching to take place in an inert atmosphere, such as nitrogen. If the object still contains solvent, the stretching temperature must also be below the temperature at which the CO copolymer dissolves in the solvent at the concentration which then exists. During this stretching at elevated temperature, any solvent which is still present will as a rule evaporate from the object and preferably the stretching conditions are chosen such that the object is virtually solvent-free at the end of the stretching process. Any solvent residues still present after stretching can still be removed by, for example, evaporation or extracting, followed by drying.

The objects thus obtained can be used, for example, as reinforcing material in composites with rubbers, cement and other matrices, for improving the impact strength and in general where the demand is for strong fibres, films or tapes resistant to high temperatures.

In order to achieve the high modulus of elasticity and the high tensile strength, in the method according to the invention the elongated objects are essentially stretched in one direction, in particular in the longitudinal direction of the object, by means of which a maximum orientation of the CO copolymer and maximum values for tensile strength and modulus, which are associated therewith, are achieved. However, it is also possible, with the method according to the invention, to stretch the particular object in two directions, so that a biaxially orientated object is obtained. For this purpose stretching is carried out biaxially and in at least one direction to a degree of stretching which is sufficient to obtain an object which has a tensile strength of at least 0.3 GPa and a modulus of elasticity of at least 3.5 GPa in that direction. Preferably, when biaxial stretching is used, the object is stretched in at least one direction to a degree of stretching such that, in that direction, the tensile strength is at least 0.5 GPa and the modulus of elasticity is at least 5 GPa.

Biaxially stretched objects of a CO copolymer having the said advantageous characteristics have not been disclosed hitherto and the invention therefore also relates to an object consisting of orientated CO copolymer which has been orientated by biaxial stretching in two directions and, in at least one direction, possesses a tensile strength of at least 0.3 GPa and a modulus of elasticity of at least 3.5 GPa and preferably a tensile strength of at least 0.5 GPa and a modulus of elasticity of 5 GPa. As a result of the unique combination of characteristics, including the high modulus and tensile strength in two directions, the high melting point and the excellent barrier characteristics, these biaxially stretched objects are suitable for many applications, in particular as packaging material. Compared with CO copolymers in which a third monomer is copolymerized, biaxially stretched objects of CO-ethene copolymer are also found to possess, in addition to the already mentioned higher melting point, better barrier characteristics, which are presumably generated by the higher crystallinity.

The invention is illustrated with the aid of the following examples, without, however, being restricted thereto. The parameters indicated in the examples are determined as described below.

The tensile strength and the modulus of elasticity are determined using a Zwick 1435 tensile strength tester on test pieces having a clamped length of 150 mm using a pulling speed of 15 mm/min in an environment with a temperature of 21° C. and a relative humidity of 65%.

The stress-strain curves of the oriented CO copolymer fibres show a shape analogous to that in fig. X1.1 in Appendix 1 of ASTM standard D790-86, so that, analogous to the determination of the flex modulus according to this standard, the tangent modulus also gives a more representative value than the initial modulus in interpretation of these curves. This supports the above assumption concerning the use of the term 'flex modulus' in EP-A-310,171. By 'modulus of elasticity' is consequently understood the tangent modulus of elasticity determined in the point where the elongation is 80% of the elongation at break; in the examples it is referred to as 'E-modulus (80%)'. For comparison the-less representative-initial modulus is also given in the measurement results, derived from the stress-strain curve in the range of 0 to 0.4% strain.

The degree of stretching is defined as the quotient of the length after stretching and the clamped length of the specimen.

Melting points are determined using a Dupont Instruments 910 Differential Scanning Calorimeter with a heating rate of 5° C./min.

The intrinsic viscosity, IV, is determined in m-cresol at 100° C.

The CO copolymers used in the examples are produced in the manner described below.

Copolymer A:

A catalyst solution of
0.08 mmol of palladium acetate,
0.08 mmol of 1,3-bis(diphenylphosphine)propane, and
0.16 mmol of para-toluenesulphonic acid, dissolved in methanol, is introduced into an autoclave. After adding ethene until a pressure of 30 bar is reached, carbon monoxide is added until a pressure of 120 bar is reached. The polymerization temperature is 20° C.

After 50 hours the pressure is released and the CO-ethene copolymer formed is filtered off and washed with methanol. The copolymer is alternating and has a melting point of 255° C. and an IV of 9.9 dl/g.

Copolymer B:

An alternating CO-ethene copolymer is produced at a polymerization temperature of 80° C. in the same way as copolymer A, with the proviso that 0.8 mmol of benzoquinone is also added to the catalyst solution and that carbon monoxide is added until a pressure of 80 bars is reached. The copolymer has a melting point of 250° C. and an IV of 1 dl/g.

EXAMPLE I 8 grams of copolymer A are dissolved at 40° C. in 100 ml of hexafluoroisopropanol. The solution is spun to a fibre through a spinning hole with a diameter of 0.5 mm and fed into an air duct, in which the solvent rapidly evaporates and the fibre solidifies. After drying for 24 hours in a nitrogen ($N_2$) environment, the fibre still contains 2.8% by weight of hexafluoroisopropanol. The fibre is stretched in a $N_2$ environment in three steps, at 200, 240 and 267° C. respectively. The total degrees of stretching, the modulus of elasticity, the tensile strength and the elongation at break are given in Table 1 for a number of different fibres stretched in this way.

TABLE 1

| Degree of stretching — | Initial modulus (GPa) | E-modulus (80%) (GPa) | Tensile strength (GPa) | Elongation at break (%) |
|---|---|---|---|---|
| 13 | 18.2 | 25.6 | 1.4 | 6.3 |
| 15 | 24.2 | 30.8 | 1.3 | 4.6 |
| 16 | 28.5 | 36.4 | 1.7 | 5.5 |
| 16 | 33.3 | 40.0 | 1.7 | 5.2 |
| 16 | 35.4 | 50.0 | 2.1 | 5.1 |
| 16 | 32.1 | 48.6 | 1.6 | 3.8 |
| 17 | 35.3 | 57.2 | 2.3 | 4.7 |
| 18 | 30.5 | 42.6 | 1.7 | 4.5 |

EXAMPLE II 8 grams of copolymer A are dissolved at room temperature in 100 ml of hexafluoroisopropanol. The solution is spun to a fibre through a spinning hole with a diameter of 0.3 mm in an acetone bath at room temperature. After drying, the fibre is stretched in three steps, at 220, 240 and 267° C. respectively, in a $N_2$ environment. The results for a number of test pieces are given in Table 2

TABLE 2

| Degree of stretching — | Initial modulus (GPa) | E-modulus (80%) (GPa) | Tensile strength (GPa) | Elongation at break (%) |
|---|---|---|---|---|
| 20 | 20.6 | 29.9 | 0.9 | 4.1 |
| 22 | 22.4 | 30.6 | 1.3 | 4.7 |
| 22 | 31.5 | 40.0 | 1.6 | slip in the clamp |
| 22 | 36.1 | 57.1 | 1.4 | 3.3 |
| 26 | 24.1 | 35.7 | 1.2 | 3.7 |

EXAMPLE III 7 grams of copolymer A are dissolved in 100 ml of m-cresol at 120° C. The solution is spun at 120° C. through a spinning hole with a diameter of 0.5 mm and cooled in an acetone bath at room temperature. After extracting and drying, the melting point of the fibres is 252° C. The fibres are stretched in three steps, at 220, 240 and 260° C. respectively, in a $N_2$ environment to a total degree of stretching of 18 x. The melting point of the stretched fibre is 268° C. and the modulus is 38.5 GPa.

EXAMPLE IV 10 grams of copolymer A are dissolved in 100 ml of m-cresol at 120° C. The solution is spun at 120° C. through a spinning hole with a diameter of 0.5 mm and cooled in a methanol bath at room temperature. After extracting and drying, the melting point of the fibres is 255° C. The fibres are stretched in two steps, at 220 and 240° C. respectively, in a $N_2$ environment. The results for a number of test pieces are given in Table 3.

TABLE 3

| Degree of stretching — | Initial modulus (GPa) | E-Modulus (80%) (GPa) | Tensile strength (GPa) | Elongation at break (%) | Melting point °C. |
|---|---|---|---|---|---|
| 10 | 20.0 | 28.6 | 1.2 | 6.9 | 271 |
| 10 | 21.4 | 30.3 | 1.1 | 9.6 | not determined |
| 12 | 26.7 | 41.1 | 1.6 | 5.0 | 273 |

EXAMPLE V 3 grams of copolymer A are dissolved in 100 ml of 3-chlorophenol. The solution is cast at room temperature to form a film. After drying until the film still contains approximately 4% by weight of solvent, the dried film is stretched in one direction in two steps, at 180° and 220° C. respectively. The results for a number of test pieces are given in Table 4.

TABLE 4

| Degree of stretching — | Initial modulus (GPa) | E-modulus (80%) (GPa) | Tensile strength (GPa) | Elongation at break (%) |
|---|---|---|---|---|
| 10 | 14.1 | 16.5 | 0.83 | 6.1 |
| 11 | 16.5 | 18.7 | 1.0 | 6.7 |
| 12 | 19.7 | 22.6 | 1.22 | 5.4 |

EXAMPLE IV 2 grams of copolymer A are dissolved at 100° C. in 100 ml of pyrrole. The solution is cast to give a film and cooled rapidly to give a gel film. After extracting the pyrrole with methanol and drying the film, the melting point of the film is 255° C. The film is cut into narrow strips, which are stretched in three steps in a $N_2$ environment, at 220, 240 and 260° C. respectively. The results are given in Table 5.

TABLE 5

| Degree of stretching — | Initial modulus (GPa) | E-Modulus (80%) (GPa) | Tensile strength (GPa) | Elongation at break (%) | Melting point °C. |
|---|---|---|---|---|---|
| 17 | 29.4 | 33.3 | 0.93 | 3.6 | 267 |
| 24 | 31.1 | 38.5 | 1.55 | 5.0 | 271 |

EXAMPLE VII

A solution of 5 grams of copolymer A in 20 ml of hexafluoroisopropanol is pressed at room temperature to give a level film. After extraction with acetone and drying, the film is post-pressed at 220° C. The melting point of the film is 261° C. The post-pressed film is stretched in one direction in two steps, at 240 and 260° C. respectively. The results are given in Table 6.

TABLE 6

| Degree of stretching — | Initial modulus (GPa) | E-Modulus (80%) (GPa) | Tensile strength (GPa) | Elongation at break (%) | Melting point °C. |
|---|---|---|---|---|---|
| 7 | 20.9 | 26.3 | 0.99 | 5.4 | 268 |
| 13 | 37.0 | 42.6 | 1.47 | 3.9 | not determined |
| 15 | 32.7 | 48.4 | 1.68 | 3.7 | 280 |
| 15 | 36.4 | 44.4 | 1.51 | 4.1 | 276 |

EXAMPLE VIII

A solution of 5 g Copolymer B in 20 ml hexafluoroisopropanol is compressed to a flat film at room temperature. After extraction with acetone and drying the film is after-compressed at 200° C. The after-compressed film is stretched in one direction in two steps, at 220 and 235° C., respectively. The results are given in Table 7.

TABLE 7

| Degree of stretching — | Initial modulus (GPa) | E-modulus (80%) (GPa) | Tensile strength (GPa) | Elongation at break (%) |
|---|---|---|---|---|
| 14 | 12.3 | 21.7 | 0.58 | 3.9 |
| 14 | 14.1 | 21.7 | 0.69 | 4.5 |

TABLE 7-continued

| Degree of stretching — | Initial modulus (GPa) | E-modulus (80%) (GPa) | Tensile strength (GPa) | Elongation at break (%) |
|---|---|---|---|---|
| 13 | 12.9 | 20.8 | 0.71 | 4.3 |

EXAMPLE IX

A solution of 5 grams of copolymer A in 20 ml of hexafluoroisopropanol is spun at room temperature through a spin opening with a diameter of 0.5 mm to give a fibre, which is passed into an acetone bath. After extracting and drying, the fibre is stretched in three steps, at 240, 260 and 280° C. respectively, in a $N_2$ environment. The results for various test pieces are given in Table 8.

TABLE 8

| Degree of stretching — | Initial modulus (GPa) | E-modulus (80%) (GPa) | Tensile strength (GPa) | Elongation at break (%) |
|---|---|---|---|---|
| 15 | 32.8 | 43.6 | 1.5 | 3.7 |
| 18 | 37.4 | 52.2 | 1.8 | 3.5 |
| 21 | 40.7 | 60.3 | 2.1 | 3.6 |
| 20 | 36.0 | 58.1 | 2.2 | 4.0 |

EXAMPLE X

A solution of 2 grams of copolymer A in 100 ml of 2-chlorophenol is cast at room temperature into a Petri dish to a thickness of 2 mm. By passing methyl ethyl ketone vapour over the dish, a film which can be handled is formed. After extraction with acetone and drying, the film is stretched to 12× at 220° C. The E-modulus (80%) is 27.3 GPa, the initial modulus 19.4 GPa and the tensile strength 1.05 GPa. The film is then stretched further to 14×. The E-modulus (80%) is 32.3 GPa, the initial modulus 23,6 GPa and the tensile strength 1.25 GPa.

Comparative Experiment A

Copolymer A is spun as the melt at 280° C. from a Göttfert ViscoTester 1500. After warming in the ViscoTester for 4 minutes, yellow-brown powder, which does not form a fibre, issues from the spin opening. Powder is likewise obtained at 260° C.; although this powder is less discoloured it again does not form a coherent fibre. On lowering the temperature to 240° C., that is to say below the melting point of the polymer, the maximum pressure which the ViscoTester can supply is not sufficient to press the polymer through the spin opening.

Comparative Experiment B

Copolymer B is spun in the manner of Comparative Example A. In this case also discoloured powder and not a fibre is obtained.

Comparative Experiment C

Copolymer A is pressed for 4 minutes at a temperature of 280° C. and a pressure of 80 bars in a $N_2$ environment to give a level film 0.7 mm thick. The film is discoloured to dark brown. The film is stretchable at high temperature, but it displays no flow effects above 260° C., the melting point of the polymer, shows elastic behaviour and returns to its original dimensions after stretching. This behaviour is probably caused by crosslinking and degradation of the material. Copolymer B is pressed for 2 minutes at a temperature of 260° C. and a pressure of 80 bars to form a thin film with a thickness of 0.3 mm. The material is stretched at 225° C. The results are given in Table 9. The material is found not to be stretchable at 240° C.

TABLE 9

| Degree of stretching | E-Modulus (80%) (GPa) | Tensile strength (GPa) | Elongation at break (%) |
|---|---|---|---|
| 8 | 4.3 | 0.41 | 7.4 |
| 9 | 5.3 | 0.42 | 6.3 |
| 11 | 6.4 | 0.36 | 4.8 |

I claim:

1. A process for producing an elongated object of an alternating copolymer of carbon monoxide and an olefinically unsaturated monomer wherein the copolymer has an intrinsic viscosity measured in m-cresol at 100° C. of at least 1 dl/g, which comprises
converting a solution of said copolymer into a solvent-containing object,
removing between 90 and 99.9% of the solvent from the solvent-containing object, and
stretching the thus obtained object at a temperature below the melting point of the copolymer.

2. A method according to claim 1, wherein the copolymer is a carbon monoxide-ethylene copolymer.

3. A method according to claim 1, wherein the solvent has a dipole moment between $3 \times 10^{-30}$ and $9 \times 10^{-30}$ Coulomb-meter, and said solvent has a Hildebrand solubility parameter of between 16 and 27 $MPa^{-\frac{1}{2}}$.

4. A method according to claim 3, wherein said solvent is selected from the group consisting of phenol, pyrrole, 2-chlorophenol and 3-chlorophenol.

5. A method according to claim 1, wherein the concentration of the copolymer in said solution is between 0.5 and 50% by weight.

6. A method according to claim 5, wherein the concentration of the copolymer in the solution is between 10 and 35% by weight.

7. A method according to claim 1, wherein a gelling solvent is used and the solvent-containing object is cooled to a temperature below the gel point of the solution.

8. A method according to claim 1, wherein the stretching is carried out to a degree of stretching which is sufficient to obtain an object having a modulus of at least 16 GPa.

9. A method according to claim 1, wherein the stretching is carried out biaxially and in at least one direction to a degree of stretching which is sufficient to obtain an object having a tensile strength of at least 0.3 GPa and a modulus of elasticity of at least 3.5 GPa in the direction of stretching.

10. A method according to claim 9, wherein the stretching is conducted such that the tensile strength in the at least one direction is at least 0.5 GPa and the modulus of elasticity is at least 5 GPa.

11. A method according to claim 1, wherein the solvent is a gelling solvent.

* * * * *

UNITED STATES PATENT AND TRADEMARK OFFICE
CERTIFICATE OF CORRECTION

PATENT NO.    : 5,403,531
DATED         : April 4, 1995
INVENTOR(S)   : RUTTEN et al It is certified that error appears in the above-identified patent and that said Letters Patent is hereby corrected as shown below:

Column 9, line 15, change "EXAMPLE IV" to
    --EXAMPLE VI--.

Signed and Sealed this

Fifth Day of September, 1995

Attest:

BRUCE LEHMAN

Attesting Officer

Commissioner of Patents and Trademarks